S. A. BRACKETT & W. W. WHITCOMB.

Seams for Boots and Shoes.

No. 5,391.

Reissued May 6, 1873.

Witnesses
John McCormack
William Standish

Samuel A. Brackett
William W. Whitcomb
Inventors

AM. PHOTO-LITHOGRAPHIC CO. N.Y. (OSBORNE'S PROCESS.)

UNITED STATES PATENT OFFICE.

SAMUEL A. BRACKETT AND WILLIAM W. WHITCOMB, OF BOSTON, MASS.

IMPROVEMENT IN SEAMS FOR BOOTS AND SHOES.

Specification forming part of Letters Patent No. 133,826, dated December 10, 1872; reissue No. 5,391, dated May 6, 1873; application filed February 26, 1873.

*To all whom it may concern:*

Be it known that we, SAMUEL A. BRACKETT and WILLIAM W. WHITCOMB, both of Boston, in the county of Suffolk and State of Massachusetts, have invented a certain Improvement in the Manufacture of Boots and Shoes, of which the following is a specification:

Our invention relates to the method of forming the seams in sewing together the parts composing the uppers of boots and shoes; and consists in stitching to each other (with or without an interposed welt) the two parts to be joined with their surfaces placed together in such manner that the edge of the one part shall extend so far beyond the line of stitching that it may be turned over the edge of the other part and again stitched beyond the edge thus covered to the main body of such other part. The edge thus covered over raises a ridge between the two lines of stitching that serves to protect the stitches from attrition in wear, and this ridge may be made more prominent by inserting a small cord under the edge to be turned over before it is sewed down. When, however, the leather is thick enough the ridge will have sufficient prominence without the use of such cord. Preferably, the edge to be turned over and sewed down over and beyond the other edge is made to extend further beyond the first line of stitching than the other edge; but when this is not the case the edge to be covered must be rolled or folded back, so that the other edge can be lapped entirely over and sewed down beyond it. Our invention is applicable to the joining together of the parts of a boot-leg, and also the other parts of the uppers of boots and shoes. The objects of our invention are to make a durable union of the parts with only two lines of stitching to protect the seam-threads from attrition in wear, and in the case of boot-legs, where the inside surfaces are placed together, to save turning in forming the seams.

*Description of the Accompanying Drawing.*

Figure 1:
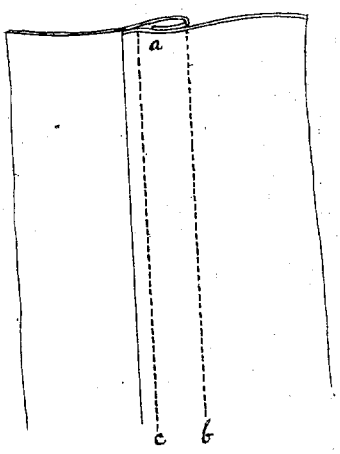
Figure 2:
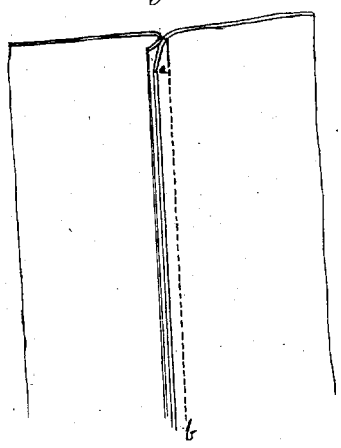
Figure 3:
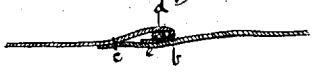

Figure 1 shows two pieces of leather with their surfaces placed together in proper position, and united by stitching them through and through with the overlapping edge *a* of one piece stitched down over and beyond the edge of the other; and *b* is the first and *c* the second line of stitching. Fig. 2 shows the same before the overlapping edge *a* has been stitched down. Fig. 3 is a sectional view with the overlapping edge *a* stitched down and the small cord *d* inserted to make more prominent the ridge *e* between the lines of stitches.

We claim as our invention—

In a boot or shoe, the seam formed by stitching the two parts to be joined to each other, with their surfaces placed together, as described, and then turning the edge of the one part over and stitching it down beyond the edge and to the main body of the other part, substantially as and for the purposes hereinbefore set forth.

SAML. A. BRACKETT.
WILLIAM W. WHITCOMB.

Witnesses:
WILLIAM STANDISH,
JOSHUA GRAY.